United States Patent
Etherington et al.

(10) Patent No.: US 9,212,938 B2
(45) Date of Patent: Dec. 15, 2015

(54) SENSOR DEVICE FOR DETECTING A FLOW PROPERTY OF A FLUID MEDIUM

(75) Inventors: Kurt Etherington, Brighton, MI (US); Norbert Schneider, Tiefenbronn (DE); Andreas Kaufmann, Sontheim an der Brenz (DE); Hans Beyrich, Freiberg/N (DE); Michael Rittmann, Ditzingen (DE); Wolfgang Dann, Truegleben (DE); Uwe Konzelmann, Asperg (DE); Andreas Roehler, Eisenach (DE); Frank Ullrich, Eisenach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 146 days.

(21) Appl. No.: 13/882,434

(22) PCT Filed: Sep. 2, 2011

(86) PCT No.: PCT/EP2011/065213
§ 371 (c)(1),
(2), (4) Date: Jul. 3, 2013

(87) PCT Pub. No.: WO2012/055622
PCT Pub. Date: May 3, 2012

(65) Prior Publication Data
US 2013/0269419 A1      Oct. 17, 2013

(30) Foreign Application Priority Data

Oct. 28, 2010   (DE) .................. 10 2010 043 083

(51) Int. Cl.
*G01M 3/02*        (2006.01)
*G01F 1/684*       (2006.01)
(Continued)

(52) U.S. Cl.
CPC ............. *G01F 1/684* (2013.01); *F02D 41/187* (2013.01); *G01D 11/245* (2013.01); *G01F 1/692* (2013.01);
(Continued)

(58) Field of Classification Search
CPC ....... G01F 1/6842; G01F 1/692; G01F 15/02; F02D 2200/0418; F02D 2400/18; F02D 2041/285
USPC ............. 73/37, 53.01, 53.04, 114.32, 114.33, 73/114.34, 204.11
See application file for complete search history.

(56) References Cited

U.S. PATENT DOCUMENTS 4,083,244 A * 4/1978 Agar et al. ................. 73/204.21
6,012,432 A * 1/2000 Igarashi et al. ............... 123/494
(Continued)

FOREIGN PATENT DOCUMENTS

EP      1 017 931       12/2003
EP      2 154 494       2/2010

OTHER PUBLICATIONS

International Search Report, International Application No. PCT/EP2011/065213, dated Nov. 4, 2011.
(Continued)

*Primary Examiner* — Laura Martin
*Assistant Examiner* — Samir M Shah
(74) *Attorney, Agent, or Firm* — Kenyon & Kenyon LLP

(57) ABSTRACT

A sensor device for detecting at least one flow property of a fluid medium. The sensor device includes at least one sensor housing, in which at least one electronic module having at least one flow sensor for detecting the flow property is accommodated. The electronic module is at least partially accommodated in at least one electronic space. Furthermore, at least one pressure sensor and at least one humidity sensor are accommodated inside the sensor housing. The pressure sensor and also the humidity sensor are at least partially accommodated in at least one sensor space, which is designed separately from the electronic space.

9 Claims, 3 Drawing Sheets

(51) Int. Cl.
  *F02D 41/18* (2006.01)
  *G01D 11/24* (2006.01)
  *G01F 1/692* (2006.01)
  *G01F 5/00* (2006.01)
  *G01L 19/14* (2006.01)
  *F02D 41/28* (2006.01)

(52) U.S. Cl.
  CPC ............... *G01F 5/00* (2013.01); *G01L 19/147* (2013.01); *F02D 2041/285* (2013.01); *F02D 2200/0406* (2013.01); *F02D 2200/0418* (2013.01); *F02D 2400/18* (2013.01)

(56) References Cited

U.S. PATENT DOCUMENTS

| | | | |
|---|---|---|---|
| 6,181,574 B1 * | 1/2001 | Loibl | 361/816 |
| 6,468,222 B1 * | 10/2002 | Mault et al. | 600/531 |
| 6,581,447 B1 * | 6/2003 | Strohrmann et al. | 73/114.32 |
| 6,911,894 B2 * | 6/2005 | Bonne et al. | 338/25 |
| 7,219,543 B2 * | 5/2007 | Tanaka et al. | 73/204.22 |
| 7,243,541 B1 * | 7/2007 | Bey et al. | 73/431 |
| 7,305,878 B2 * | 12/2007 | Tanaka et al. | 73/204.26 |
| 7,370,526 B1 * | 5/2008 | Ice | 73/204.22 |
| 7,640,798 B2 * | 1/2010 | Oda | 73/204.26 |
| 7,832,269 B2 * | 11/2010 | Bey et al. | 73/431 |
| 8,091,413 B2 * | 1/2012 | Saito et al. | 73/114.33 |
| 8,104,340 B2 * | 1/2012 | Speldrich | 73/202.5 |
| 8,175,835 B2 * | 5/2012 | Dmytriw et al. | 702/100 |
| 8,397,586 B2 * | 3/2013 | Sorenson et al. | 73/861.52 |
| 8,485,031 B2 * | 7/2013 | Speldrich et al. | 73/204.22 |
| 8,549,901 B2 * | 10/2013 | Saito et al. | 73/114.33 |
| 8,573,041 B2 * | 11/2013 | Saito et al. | 73/114.32 |
| 8,701,475 B2 * | 4/2014 | Kohno | 73/114.33 |
| 2005/0022594 A1 * | 2/2005 | Padmanabhan et al. | 73/204.26 |
| 2005/0178200 A1 * | 8/2005 | Stauss et al. | 73/335.02 |
| 2005/0193812 A1 * | 9/2005 | Ice | 73/170.02 |
| 2008/0163683 A1 * | 7/2008 | Becke et al. | 73/431 |
| 2009/0314079 A1 * | 12/2009 | Opitz et al. | 73/204.26 |
| 2010/0031737 A1 * | 2/2010 | Saito et al. | 73/114.33 |
| 2010/0064799 A1 * | 3/2010 | Mais et al. | 73/204.11 |
| 2010/0180675 A1 * | 7/2010 | Schneider et al. | 73/114.31 |
| 2011/0259097 A1 * | 10/2011 | Mais et al. | 73/204.25 |
| 2013/0174654 A1 * | 7/2013 | Schneider et al. | 73/114.01 |
| 2013/0269419 A1 * | 10/2013 | Etherington et al. | 73/37 |
| 2013/0283895 A1 * | 10/2013 | Etherington et al. | 73/114.34 |

OTHER PUBLICATIONS

Robert Bosch GmbH, "Sensoren im Kraftfahzeug [Sensors in Motor Vehicles]", 2007 edition, pp. 128-130, 140-142 (translation).

* cited by examiner

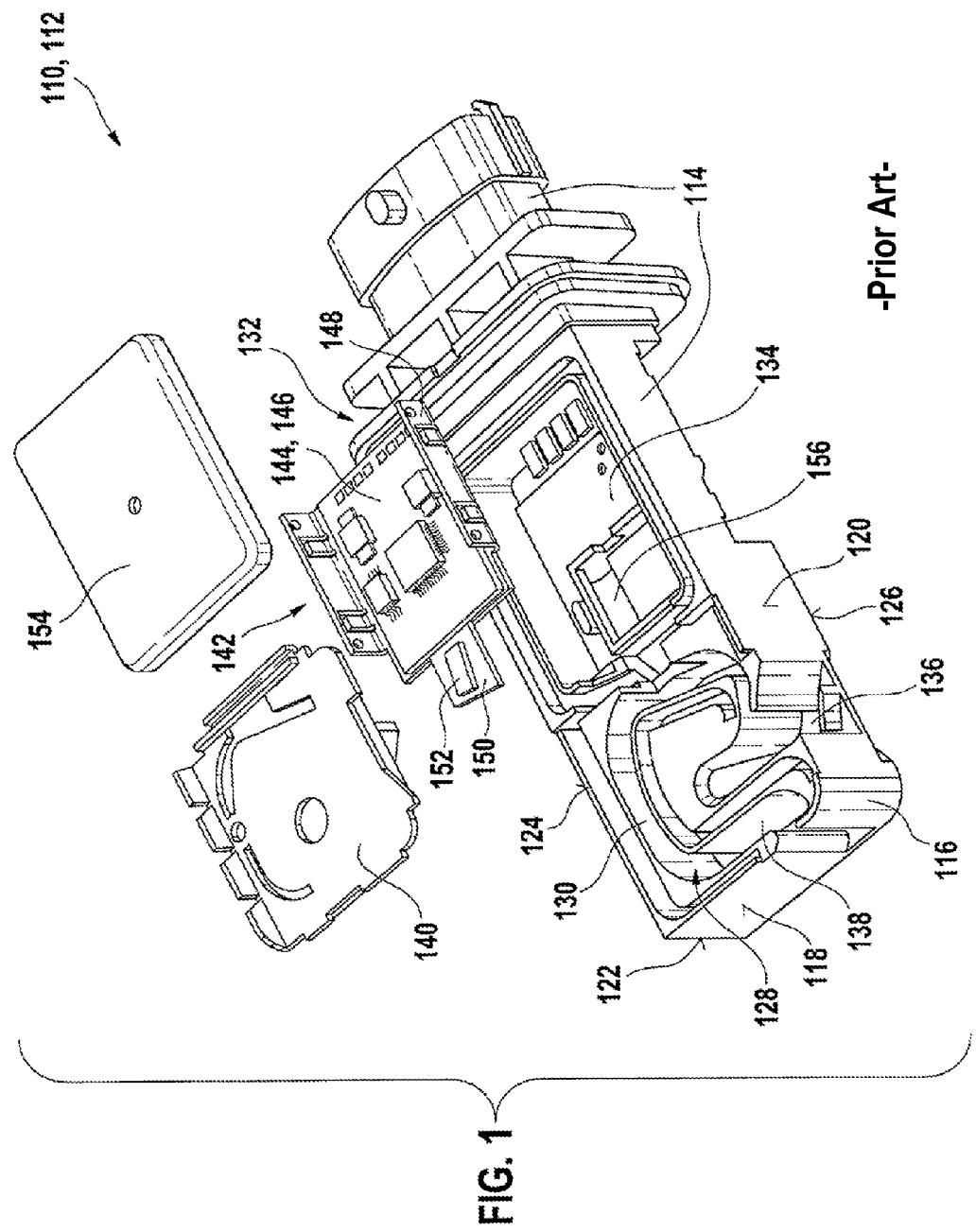
FIG. 1 -Prior Art-

SENSOR DEVICE FOR DETECTING A FLOW PROPERTY OF A FLUID MEDIUM

BACKGROUND INFORMATION

Numerous methods and devices for determining flow properties of fluid media, i.e., liquids and/or gases, are available. The flow properties may in principle be arbitrary physically and/or chemically measurable properties, which qualify or quantify a flow of the fluid medium. In particular, this may relate to a flow velocity and/or a mass flow rate and/or a volume flow rate. The present invention is described hereafter in particular with reference to so-called hot-film air mass meters, as are described, for example, in Robert Bosch GmbH: Sensoren im Kraftfahrzeug [Sensors in Motor Vehicles], 2007 edition, pages 140-142. Such hot-film air mass meters are typically based on a sensor chip, in particular a silicon sensor chip, having a measuring surface over which the flowing fluid medium may flow. The sensor chip generally includes at least one heating element and at least two temperature sensors, which are situated on the measuring surface of the sensor chip, for example. A mass flow rate and/or volume flow rate of the fluid medium may be inferred from an asymmetry of the temperature profile detected by the temperature sensors, which is influenced by the flow of the fluid medium. Hot-film air mass meters are typically designed as plug-in sensors, which are introducible permanently or replaceably into a flow tube. For example, this flow tube may be an intake manifold of an internal combustion engine.

To be able to precisely infer specific flow properties of the fluid medium from the sensor signals of the hot-film air mass meter, it is desirable in many cases to be able to provide further information about the fluid medium. Thus, for example, a sensor for an internal combustion engine is described in European Patent No. EP 1 017 931 B1, which has an air mass flow meter having a sensor element for detecting the air mass flow taken in. Adjacent to the air mass flow meter and its sensor element, a humidity sensor and a pressure sensor and an analysis circuit for processing the data output by the air mass meter or its sensor element, the humidity sensor, and the pressure sensor are provided and situated in a single housing.

In spite of the technical improvements which are achievable by the device described in European Patent No. EP 1 017 931 B1, in particular the improved signal accuracy and the possibility of determining further properties of the flowing fluid medium, such combined sensors are subject to various technical challenges. These challenges are of a design and production nature in particular. Thus, hot-film air mass meters have been commercially available for many years and are in use in numerous motor vehicles. The integration of pressure and humidity sensors in hot-film air mass meter plug-in sensors, as described in European Patent No. EP 1 017 931 B1, requires an adaptation of the geometry and the design of the plug-in sensor in many cases. Plug-in sensors already in use are therefore not replaceable or are only replaceable with difficulty by new plug-in sensors having pressure and humidity sensors, since in principle the entire module must be replaced. Furthermore, production facilities must be completely converted and reorganized in many cases, as soon as plug-in sensors having additional pressure and humidity measuring capabilities are to be produced. In particular the combined electronic module with a pressure and humidity sensor, as described in European Patent No. EP 1 017 931 B1, requires a substantial adaptation of the production and assembly procedure. In this way, keeping available externally compatible plug-in sensors of different functionalities, i.e., plug-in sensors having pressure and humidity measuring capabilities and plug-in sensors without such pressure and humidity measuring capabilities, is virtually not implementable because of cost concerns. Therefore, a sensor device for detecting a flow property of a fluid medium, which is configured to also generate pressure and temperature signals, and which is producible in a simple and cost-effective way, with the least possible modification of conventional production methods for plug-in sensors without such pressure and humidity measuring capabilities, would be desirable.

SUMMARY

In accordance with the present invention, a sensor device for detecting at least one flow property of a flowing fluid medium is provided, which largely meets these requirements and which at least largely avoids the disadvantages of conventional sensor devices of this type. For example, the above description of the sensors may be referred to with respect to the at least one flow property to be detected, which may be detected qualitatively and/or quantitatively. In particular, this flow property may be a flow velocity and/or a mass flow rate and/or a volume flow rate of the fluid medium. The fluid medium may be a gas in particular, preferably air. The sensor device is usable in particular in automotive technology, for example, in the intake manifold of an internal combustion engine. However, other fields of use are also possible.

An example sensor device in accordance with the present invention includes at least one sensor housing. A sensor housing is to be understood within the scope of the present invention as a one-part or also a multipart device, which at least largely closes the sensor device to the outside and at least largely protects it in relation to mechanical effects and preferably also other types of effects, for example, chemical effects and/or humidity effects. In particular, the sensor housing may include at least one plug-in sensor or may be designed as a plug-in sensor, the plug-in sensor being introducible into the flowing fluid medium, a replaceable introduction or also a permanent introduction being conceivable. For example, the plug-in sensor may protrude into a flow tube of the flowing fluid medium, the flow tube itself being able to be part of the sensor device or may also be provided as a separate part, for example, having an opening into which the plug-in sensor is introducible. The plug-in sensor and the flow housing may be produced in particular at least partially from a plastic material, for example, using an injection-molding method.

At least one electronic module having at least one flow sensor for detecting the flow property is accommodated in the sensor housing. An accommodation in the sensor housing is to be understood to mean that the electronic module is to be at least partially, preferably completely, enclosed by the sensor housing. The electronic module is at least partially situated in at least one electronic space of the sensor housing. An electronic space is understood within the scope of the present invention as a partially or completely closed space inside the housing, which is closed in at least one direction by the housing. The electronic space preferably includes at least one depression in the housing, which is accessible from a surface of the housing, for example, a cuboid-shaped depression. The electronic space may be accessible, as explained in greater detail hereafter, for an assembly, for example, from the surface, for example, and may be permanently or reversibly closable by at least one closure element, for example, at least one electronic space cover.

A flow sensor is to be understood in principle as an arbitrary sensor element, which is designed to detect the at least one flow property. In particular, the flow sensor may be at least one hot-film air mass meter chip, for example, of the above-described type. In particular, this hot-film air mass meter chip may include at least one silicon chip, having a measuring surface over which the flowing fluid medium may flow. For example, at least one heating element and at least two temperature sensors may be situated on this sensor surface, as described above, the at least one flow property being inferrable from an asymmetry of the temperature profile measured with the aid of the temperature sensor. The at least one flow sensor may be situated, for example, on a sensor carrier of the electronic module, which protrudes into the flowing fluid medium. The electronic module may be designed in one piece in particular and may carry an activation and/or analysis circuit in particular, which is configured to activate the flow sensor and/or to record signals of the flow sensor. Accordingly, the electronic module may have at least one circuit carrier, for example. Furthermore, the electronic module may have in particular the at least one sensor carrier, which is preferably mechanically connected to the circuit carrier. For example, the circuit carrier may be situated in an electronic space of the sensor housing, and the sensor carrier may protrude out of this electronic space into the fluid medium. It is particularly preferable if the sensor housing has at least one channel through which the fluid medium may flow, the sensor carrier of the electronic module, which carries the flow sensor, protruding out of the electronic space into the at least one channel in the sensor housing, through which the fluid medium may flow. This at least one channel may be designed in one piece in particular, but may also have at least one main channel and at least one bypass channel branching off of this main channel, the sensor carrier preferably protruding into the bypass channel. The circuit carrier of the electronic module may include a circuit board in particular, which is used alone or which is installed on a mechanical carrier, for example, a stamped-bent part, for example, made of a metallic material, for example. The sensor carrier may be directly connected to the circuit carrier or also to the carrier part, for example, the stamped-bent part, for example, in that the sensor carrier is extruded onto this stamped-bent part. Other embodiments are also possible. Thus, for example, it is possible to produce the electronic module from a circuit board material, both the circuit carrier and the sensor carrier being produced from the circuit board material, preferably from one piece of the circuit board material. It is in turn alternatively or additionally also possible to use conventional injection-molded circuit boards as the electronic module, for example, injection-molded circuit boards in one or more so-called MID technologies (MID: molded interconnect device). Various embodiments are possible.

The sensor device also has at least one pressure sensor and at least one humidity sensor. The pressure sensor and the humidity sensor are accommodated inside the sensor housing. An arrangement inside the sensor housing is again to be understood as an arrangement in which both the pressure sensor and the humidity sensor are at least partially, preferably completely, enclosed by the sensor housing. The pressure sensor and preferably also the humidity sensor are at least partially and preferably completely accommodated in at least one sensor space designed separately from the electronic space. Similarly to the electronic space, a sensor space is understood within the scope of the present invention as a partially or completely closed space inside the housing, which is closed in at least one direction by the housing. The sensor space preferably includes at least one depression in the housing, which is accessible from a surface of the housing, for example, a cuboid-shaped depression. The sensor space may be accessible for an assembly, for example, as explained in greater detail hereafter, for example, from the surface, and may be permanently or reversibly closable by at least one closure element, for example, at least one sensor space cover. For example, the electronic space cover and the sensor space cover may be situated on opposing sides of the housing. Alternatively, the sensor space may also be at least partially open, for example, in that it is designed as a depression in the housing, for example, as a depression opposite to the electronic space. However, a closable design is preferable, in which, for example, the sensor space is closable by a sensor space cover.

A pressure sensor is to be understood in principle as an arbitrary sensor element which is configured to detect a pressure of the fluid medium. In particular, this may be a micromechanical pressure sensor in this case, as is described, for example, in Robert Bosch GmbH: Sensoren im Kraftfahrzeug [Sensors in Motor Vehicles], pages 128-130. However, other types of pressure sensors are alternatively or additionally usable, for example, pressure sensors which are based directly on the use of one or more strain gauges or similar pressure sensor elements. A humidity sensor is to be understood in principle as an arbitrary sensor element which is configured to detect a humidity of the fluid medium. For example, resistive and/or capacitive sensor elements come into consideration in this case. Examples of such humidity sensors are described in Robert Bosch GmbH: Sensoren im Kraftfahrzeug [Sensors in Motor Vehicles], 2007 edition, pages 92-95. However, other types of humidity sensors also come into consideration, in principle alternatively or additionally, for use within the scope of the present invention. The example embodiment according to the present invention of the sensor device offers the advantage, as explained in greater detail hereafter, that the electronic space and the sensor space may be assembled independently of one another. In this way, for example, the sensor device according to the present invention may be produced, without large changes of the design and/or the assembly tools, on a production platform which may also be used for sensor devices without a pressure sensor and without a humidity sensor.

The electronic module may include in particular an activation and/or analysis circuit for the at least one flow sensor. The pressure sensor and the humidity sensor may in particular each have sensor electronics, which are designed separately from the electronic module. The electronic module may include in particular a sensor carrier, the sensor carrier carrying the flow sensor and protruding out of the electronic space into at least one channel in the sensor housing, through which the fluid medium may flow. However, other embodiments are also possible in principle. For example, a passage may be provided in a wall of the electronic space, which connects the electronic space to the at least one channel, the sensor carrier protruding through the passage into the at least one channel.

The electronic space and the sensor space may in particular be accessible from opposing sides of the sensor housing, for example, for an assembly. For example, as stated above, the sensor device may include at least one plug-in sensor, which is introducible at least partially into the fluid medium. For example, the electronic space and the sensor space may be accessible from opposing sides of the plug-in sensor of the sensor device. Thus, for example, the plug-in sensor may have a plug-in direction, along one axis, for example, the opposing sides preferably being designed generally parallel to the plug-in direction. For example, the plug-in sensor may have a generally rectangular cross section in a plane perpendicular to the plug-in direction, having a front side pointing toward the flow and a rear side pointing away from the flow, the sides being situatable generally parallel to the flow direction. In particular, these sides may be the long sides of a rectangle. The electronic space and the sensor space may in particular each be closable independently of one another by closure elements, in particular at least one electronic space cover and/or at least one sensor space cover. These covers may be latchable with the housing or may be closable in another way, for example. Alternatively or additionally to a cover structure, other types of closure elements are also conceivable.

The sensor housing may have in particular at least one inlet opening, which is connected to the sensor space, for applying a pressure of the fluid medium to the pressure sensor and/or for applying the fluid medium or its humidity to the humidity sensor. The at least one inlet opening may be designed separately for the pressure sensor and the humidity sensor. Alternatively or additionally, however, one or more shared inlet openings may also be used. The inlet opening may be designed in particular in such a way that the fluid medium may penetrate unobstructed through the inlet opening into the sensor space. However, the at least one inlet opening may alternatively also be designed as entirely or partially closed, for example, by at least one diaphragm, in particular at least one diaphragm which is at least partially permeable to humidity, in particular a semipermeable diaphragm. The at least one inlet opening may in principle have an arbitrary cross section, for example, a rectangular and/or round and/or polygonal cross section. Other embodiments are also possible. The at least one inlet opening may be provided in particular in a sensor space cover of the sensor housing, the sensor space being at least partially closable with the aid of the sensor space cover.

The humidity sensor may in particular have at least one measuring chamber situated at least partially in the sensor space. For example, the humidity sensor may itself have a housing in which the measuring chamber is situated. The measuring chamber may be closed in particular by at least one diaphragm which is at least partially permeable to humidity. The humidity sensor may in particular have at least one circuit carrier, for example, at least one circuit board and/or another type of circuit carrier. For example, the circuit carrier may be produced from a plastic material and/or ceramic material and/or a circuit board structure. Other embodiments are also possible. The circuit carrier may in particular be accommodated completely or partially in the sensor space. The pressure sensor may be situated in the sensor space independently of the circuit carrier of the humidity sensor, for example, adjacent to the circuit carrier. Alternatively or additionally, however, the pressure sensor may also be entirely or partially connected to the circuit carrier of the sensor space. The pressure sensor and the humidity sensor may in particular include at least one shared feed line, for example, at least one supply line and/or at least one signal line and/or at least one ground line. In particular, the at least one feed line of the pressure sensor may be electrically contactable to at least one feed line of the humidity sensor via at least one shared plug contact.

The sensor device may additionally also include one or more further sensor elements, for detecting at least one further physical and/or chemical property of the fluid medium. In particular, the sensor device may also have at least one temperature sensor, in particular at least one temperature sensor situated on an outer side of the sensor housing. For example, a temperature sensor may be situated on an outer side of the sensor housing in such a way that it is also situated on the same side as the inlet opening for the humidity and/or the pressure opening. However, another embodiment is also possible in principle. In particular, the temperature sensor may be situated in at least one depression on a side wall of the plug-in sensor. The temperature sensor may in particular include at least one temperature-dependent resistor. Alternatively or additionally, other types of temperature sensors are also possible. In particular, the flowing fluid medium may be able to flow freely over the temperature sensor, i.e., the temperature sensor may not be enclosed by the housing of the sensor element. The temperature sensor may in particular be connected by a friction lock and/or form fit to the housing, for example, in that feed lines of the temperature sensor are caulked to an outer wall of the sensor housing or connected in another way. Feed lines of the temperature sensor may in particular be led into the interior of the sensor housing and connected therein to the electronic module, for example, and/or connected to a plug connector of the sensor device. Various other embodiments are possible.

The above-described sensor device has numerous advantages over conventional sensor devices. The sensor device may in particular be designed with respect to its external dimensions as generally compatible with conventional sensor devices without a pressure sensor and without a humidity sensor. In particular, plug-in sensors may be produced, which, independently of whether or not they contain a pressure sensor and a humidity sensor, remain the same in their external dimensions. Furthermore, sensor devices of the mentioned type with and without pressure sensors or humidity sensors may be manufactured on the same manufacturing line as sensor devices which do not include such pressure and/or humidity sensors. In this way, the production, logistics, and warehousing of the described sensor devices are significantly simplified. Thus, for example, various sensor housings may be held available, which differ practically exclusively in the design of the electronic space and the optional sensor space, in that, for example, sensor housings with a sensor space are provided for sensor devices with a pressure sensor and a humidity sensor, and in that no such sensor space is provided in other sensor housings. Alternatively, the logistics may also work with a single type of sensor housing, for example, the sensor space may remain unassembled in the case of a production of sensor devices without a pressure sensor and without a humidity sensor. Overall, the design, manufacture, logistics, and warehousing may thus be significantly simplified and improved, and the sensor devices may be designed significantly more cost-effectively. In addition, the possibility exists of replacing already provided conventional sensor devices without pressure and humidity sensors by sensor devices according to the present invention.

BRIEF DESCRIPTION OF THE DRAWINGS

Other optional details and features of the present invention result from the following description of preferred exemplary embodiments, which are schematically shown in the figures.

FIG. 1 shows a conventional sensor device for detecting at least one flow property of a fluid medium.

DETAILED DESCRIPTION OF EXAMPLE EMBODIMENTS

Figure 2A:
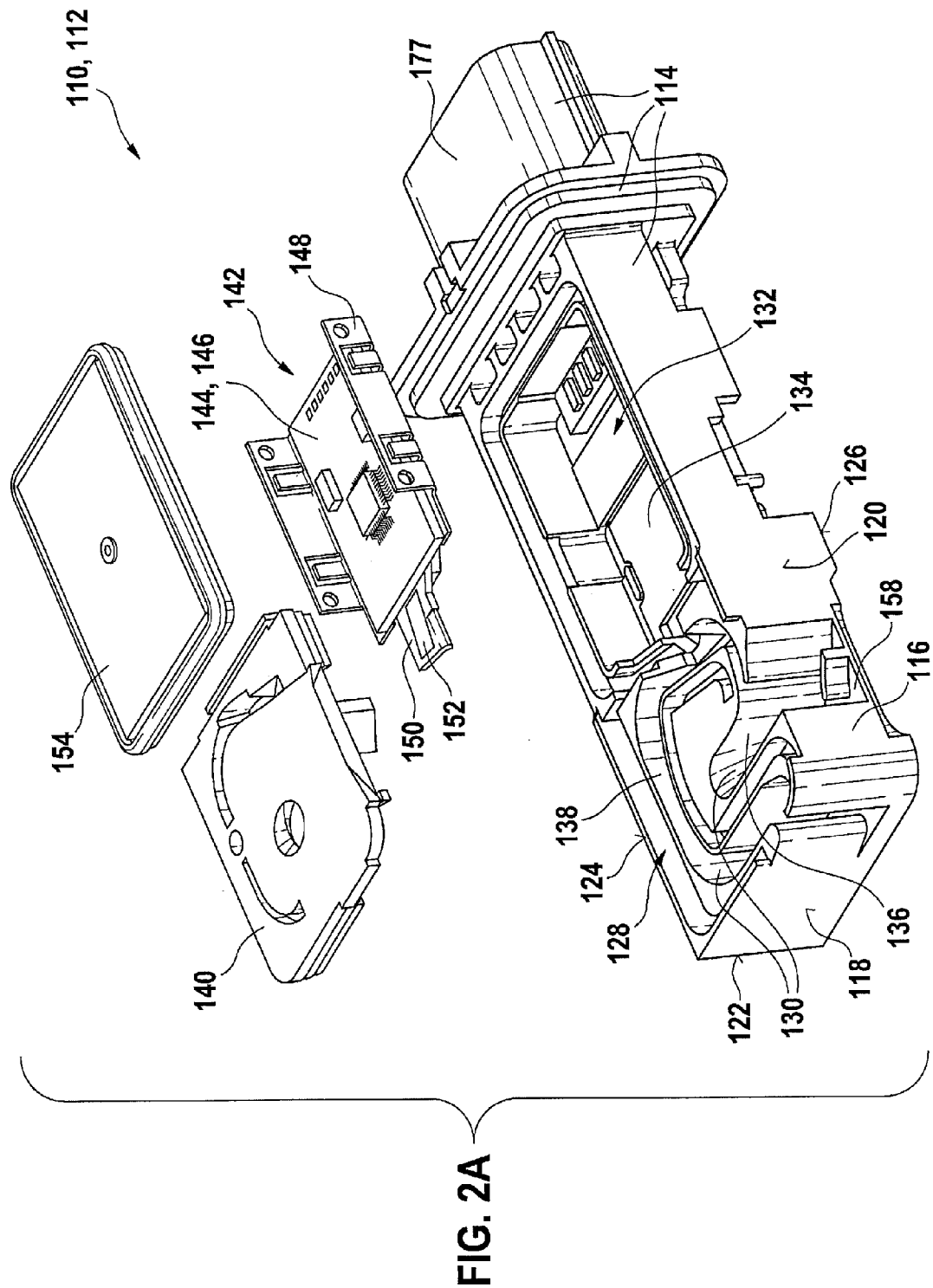
FIGS. 2A and 2B show various views of a specific embodiment according to the present invention of a sensor device.

FIG. 1 shows an exemplary embodiment of a conventional sensor device 110, for detecting at least one flow property of a fluid medium in a perspective, open view. Sensor device 110 is designed in this exemplary embodiment as a hot-film air mass meter 112 and includes a plug-in sensor 114, which is introducible into a flow of the fluid medium, for example, an intake air mass flow, for example, reversibly pluggable or permanently installed in an intake manifold. Hot-film air mass meter 112 corresponds to a commercially available air mass flow sensor of the type HFM7 from Robert Bosch GmbH, Germany. Plug-in sensor 114 includes a sensor housing 116, having a head side 118, which protrudes farthest into the fluid medium, a front side 120 pointing toward the fluid medium, a rear side 122 facing away from the fluid medium, and two side faces in the form of a first side 124 and a second side 126, first side 124 being recognizable in the view according to FIG. 1.

A channel area 128 having at least one channel 130, through which the fluid medium may flow, and an electronic area 132 having an electronic space 134 incorporated in sensor housing 116 are accommodated inside sensor housing 116. Channel 130 in turn has a main channel 136 and a bypass channel 138. Channel area 128 is closable by a channel space cover 140 on first side 124. Electronic space 134 is designed in this exemplary embodiment as a rectangular depression in first side 124 of sensor housing 116. An electronic module 142 is accommodated in electronic space 134, which includes a circuit carrier 144 having an activation and/or analysis circuit 146, which may be accommodated on a base plate 148, for example. Furthermore, electronic module 142 includes a sensor carrier 150 in the form of a wing, which protrudes into bypass channel 138 and is extruded onto base plate 148. A flow sensor 152 in the form of a hot-film air mass meter chip is incorporated in sensor carrier 150. Electronic space 134 is closable on first side 124 by an electronic space cover 154. Furthermore, sensor housing 116 may include a cooling opening 156 on second side 126, which extends into electronic space 134.

In the commercially available design of sensor device 110 according to FIG. 1, sensor carrier 150 and base plate 148 therefore form a unit, which is referred to as electronic module 142 and which, for example, in this or also in other exemplary embodiments may contain an activation and/or analysis circuit 146 for activating and/or analyzing flow sensor 152. In addition to flow sensor 152, the electronics of circuit carrier 144 and activation and/or analysis circuit 146 are glued onto base plate 148. Flow sensor 152 and activation and/or analysis circuit 146 are generally connected to one another by bond connections. Electronic module 142 thus created is glued, for example, into electronic space 134, and entire plug-in sensor 114 is closed by covers 140, 154.

Figure 2B:
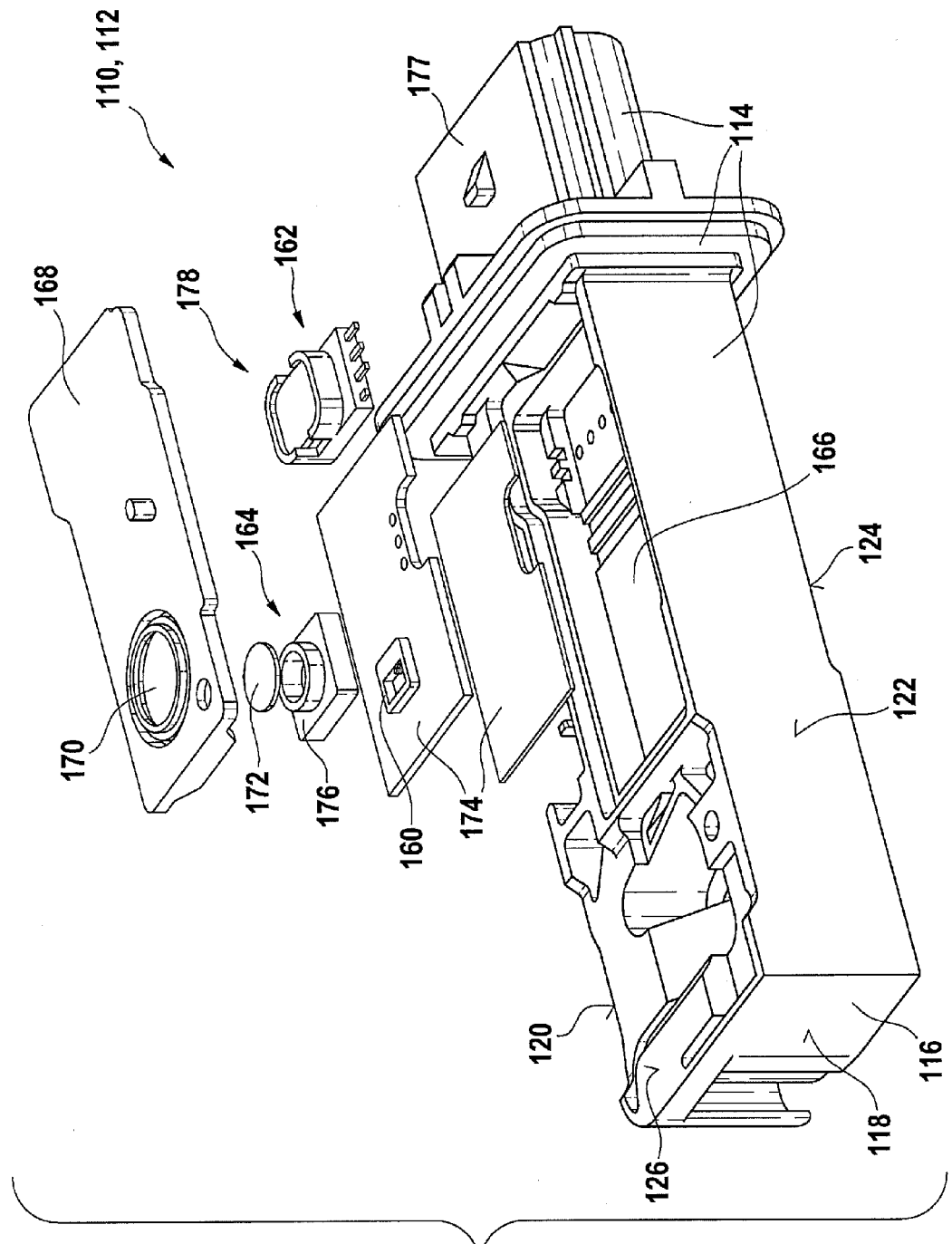

In contrast, FIGS. 2A and 2B show an exemplary embodiment according to the present invention of a sensor device 110. This is again an example of a hot-film air mass meter 112, which is preferably initially designed similarly in principle to sensor device 110 according to FIG. 1. Accordingly, reference may be made to the description of FIG. 1 for large parts of the configuration of sensor device 110. FIG. 2A shows an open perspective view of first side 124, whereas FIG. 2B shows a perspective view of second side 126. Hot-film air mass meter 112 again includes a plug-in sensor 114 having a sensor housing 116. A channel area 128 is again provided in sensor housing 116, similarly to plug-in sensor 114 according to FIG. 1, having a channel 130, into which a fluid medium may flow via a channel inlet opening 158 provided on a front side 120 of plug-in sensor 114. Furthermore, an electronic space 134 in an electronic area 132 is again provided, in which an electronic module 142 having a flow sensor 152 is provided. In this regard, reference may be made at least largely to the above description. Channel area 128 is again closable by a channel space cover 140, and electronic space 134 is closable by an electronic space cover 154. Other embodiments are also possible in principle. In sensor device 110 according to FIGS. 2A and 2B, a humidity sensor 160 and a pressure sensor 162 are additionally integrated into the provided installation space. Humidity sensor 160 and/or pressure sensor 162 may each be individual sensors or sensor modules. For example, humidity sensor 160 may be designed as a humidity module 164 or may be contained in a humidity module 164. Humidity sensor 160 and pressure sensor 162 may be designed separately from one another, but may also be designed in combination in principle.

In contrast to the conventional embodiment according to FIG. 1, in sensor device 110 according to FIGS. 2A and 2B, a spatial separation is provided between electronic module 142, on the one hand, and pressure sensor 162 and humidity sensor 160, on the other hand. Thus, pressure sensor 162 and humidity sensor 160 are accommodated in the example embodiment according to the present invention according to FIGS. 2A and 2B in a sensor space 166 designed separately from electronic space 134. This sensor space 166 is again designed in this example as a depression in second side 126, which is opposite first side 124 having electronic space 134. Therefore, this sensor space 166 may be designed, for example, as a rear side chamber and may be designed in such a way that it may be assembled from second side 126. Sensor space 166 is therefore at least essentially separated from electronic space 134, so that in this or also in other exemplary embodiments, a separate introduction of electronic module 142 and pressure or humidity sensor 160, 162 may be carried out, for example, from different assembly directions. For example, as is apparent in FIG. 2B, sensor space 166 may be closable by at least one closure element, in particular at least one sensor space cover 168. This sensor space cover 168 and/or other parts of sensor housing 116 may include one or more inlet openings 170 in the illustrated exemplary embodiment, which may be used for the pressure and/or humidity measurement. In the illustrated exemplary embodiment according to FIG. 2B, a round inlet opening 170 is provided in sensor space cover 168 as an example. However, other embodiments are also possible in principle. As an example, this inlet opening 170 is situated above a semipermeable diaphragm 172 of humidity sensor 160, for example, so that humidity may be applied to humidity sensor 160 via inlet opening 170. Simultaneously, inlet opening 170 and/or a separate inlet opening may be used to apply pressure to pressure sensor 162.

As an example, as described above, humidity sensor 160 in the illustrated exemplary embodiment is an integral part of a humidity module 164, which may also itself as a whole act as a humidity sensor 160. This humidity module 164 and/or humidity sensor 160 may include at least one circuit carrier 174, for example, on which optionally one or more printed conductors and/or one or more electronic components may be accommodated, for example, an activation circuit for humidity sensor 160. Other embodiments are also possible, however. Humidity sensor 160 and/or humidity module 164, a differentiation not being made between the two units hereafter, may also include at least one measuring chamber 176, in which, for example, the at least one humidity sensor 160 and/or a chip thereof may be accommodated. It may be placed on circuit carrier 174, for example, and may be covered on top by semipermeable diaphragm 172, for example. Pressure sensor 162 may be accommodated adjacent to humidity module 164 in sensor space 166, for example. Other embodiments are also possible.

In this way, for example, with the aid of the exemplary embodiment shown in FIGS. 2A and 2B, a rear side configuration may be implemented, in which the assembly of pressure and humidity sensors 162, 160 may be carried out on a separate manufacturing line. The further configuration and the further assembly of electronic space 134 may be carried out, for example, on existing serial production equipment, for example, for producing sensor device 110 according to FIG. 1. The advantage of the rear side configuration in relation to the conventional configuration is independent spaces 134, 166, which are completely separate from one another. Through sensor space 166 for integrating the pressure and humidity measurement, electronic space 134 for assembly of electronic module 142 generally remains preferably unchanged, in contrast to the configuration shown in FIG. 1.

In contrast to conventional configuration schemes, no changes therefore preferably result for the assembly of electronic module 142, since the size and position of the support surfaces of electronic module 142 may remain unchanged, for example. Modifications to serial production equipment and processes are therefore generally not necessary. The assembly of pressure and humidity sensors 162, 160 in plug-in sensor 114 may be carried out on a separate manufacturing line, for example, before or after the assembly of electronic space 134. For example, a plug-in sensor module pre-assembled in this way may then be transferred to existing serial production equipment and processed further thereon. Humidity module 164 may include a circuit board as circuit carrier 174, for example. Actual humidity sensor 160 may be situated thereon, and optionally an activation and/or analysis circuit of humidity module 164. Actual humidity sensor 160 may be situated, for example, in measuring chamber 176, whose opening may be closed by semipermeable diaphragm 172. This semipermeable diaphragm 172 may be permeable to humidity, for example, and may simultaneously protect humidity sensor 160 from penetrating water and dirt, however. Humidity module 164 may be glued into sensor space 166 and/or fixed in another way in sensor space 166. Humidity module 164 may be connected to a plug 177 of plug-in sensor 114 by bond connections, for example.

For example, a micromechanical pressure sensor may be used as pressure sensor 162, which may in turn also be integrated into a pressure sensor module 178, for example. The premold of the commercially available pressure sensor of the type DS-S3 from Robert Bosch GmbH, Germany may be used as pressure sensor 162, for example. Pressure sensor 162 may be installed in particular adjacent to humidity module 164 and may again be connected to sensor housing 116, for example, again by an adhesive bond, for example. Pressure sensor 162 may again be contacted and electrically connected to plug 177. For example, a welded bond may be used for this purpose. Other embodiments are also possible, however. Pressure may also be applied to pressure sensor 162 through the same inlet opening 170 which also applies humidity to humidity sensor 160. Alternatively or additionally, however, one or more inlet openings 170 may also be provided as separate pressure measuring openings, for example, on second side 126 of plug-in sensor 114, for example, again in sensor space cover 168.

What is claimed is:

1. A sensor device for detecting at least one flow property of a fluid medium, comprising:
   at least one sensor housing;
   at least one electronic module having at least one flow sensor to detect the flow property, the at least one electronic module accommodated in the t least one sensor housing, the at least one electronic module including at least one hot-film air mass meter chip, the at least one electronic module being at least partially accommodated in at least one electronic space of the at least one sensor housing, wherein the at least one electronic module includes a sensor carrier, the sensor carrier carrying the at least one flow sensor and protruding out of the at least one electronic space into at least one channel in the sensor housing, through which the fluid medium may flow; and
   at least one pressure sensor and at least one humidity sensor accommodated inside the at least one sensor housing, wherein the at least one pressure sensor and the at least one humidity sensor are at least partially accommodated in at least one sensor space, which is designed spatially separate from the at least one electronic space.

2. The sensor device as recited in claim 1, wherein the at least one electronic space and the at least one sensor space are accessible from opposing sides of the at least one sensor housing, and from opposing sides of a plug-in sensor of the sensor device.

3. The sensor device as recited in claim 1, wherein the at least one electronic space and the at least one sensor space are each closable independently of one another by closure elements, including at least one electronic space cover and at least one sensor space cover respectively.

4. The sensor device as recited in claim 1, wherein the at least one sensor housing has at least one inlet opening, which is connected to the at least one sensor space, for at least one of applying a pressure of the fluid medium to the at least one pressure sensor, and applying a humidity of the fluid medium to the at least one humidity sensor.

5. The sensor device as recited in claim 4, wherein the at least one inlet opening is provided in a sensor space cover of the at least one sensor housing, the at least one sensor space being at least partially closable with the aid of the sensor space cover.

6. The sensor device as recited in claim 1, wherein the at least one humidity sensor has at least one measuring chamber situated in the at least one sensor space.

7. The sensor device as recited in claim 6, wherein the at least one measuring chamber is closed by at least one diaphragm, which is at least partially permeable to humidity.

8. The sensor device as recited in claim 1, wherein the at least one humidity sensor has at least one circuit carrier, the at least one circuit carrier being accommodated in the at least one sensor space.

9. The sensor device as recited in claim 8, wherein the at least one pressure sensor is situated adjacent to the at least one circuit carrier of the at least one humidity sensor in the at least one sensor space.

* * * * *